UNITED STATES PATENT OFFICE.

THOMAS J. SPEAR, OF NEW ORLEANS, LOUISIANA.

IMPROVEMENT IN THE MANUFACTURE OF INDELIBLE WRITING-INK.

Specification forming part of Letters Patent No. 2,176, dated July 16, 1841.

*To all whom it may concern:*

Be it known that I, THOMAS J. SPEAR, of the city of New Orleans, parish of Orleans, and State of Louisiana, have discovered a new and useful Method of Making Indelible Writing-Ink, which is described as follows:

To make four ounces of indelible writing-ink, take three drams of the best bruised india-ink and four ounces of boiling solution of caustic soda and mix these together and shake the mixture well for about ten minutes, when the indelible writing-ink is produced.

What I claim as my discovery, and which I desire to secure by Letters Patent, is—

The before-described indelible writing-ink.

THOS. J. SPEAR.

Witnesses:
   WM. P. ELLIOT,
   W. E. GRUNWELL.